(12) United States Patent
Borregard et al.

(10) Patent No.: US 12,168,946 B2
(45) Date of Patent: *Dec. 17, 2024

(54) EXHAUST SPECIES TRACKING AND NOTIFICATION SYSTEM

(71) Applicant: Cummins Inc., Columbus, IN (US)

(72) Inventors: Robert C. Borregard, Charleston, SC (US); Hasan Mohammed, Charleston, SC (US); Atin Tandon, Greenwood, IN (US); Daniel J. Robinson, Columbus, IN (US); Matthew W. Isaacs, Moncks Corner, SC (US); Benjamin Goldberger, Mt. Pleasant, SC (US); Arturo Mendoza-Pinon, Columbus, IN (US); Douglas Carnecki, Columbus, IN (US); Frank Ruggiero, Columbus, IN (US); David L. Hirt, Columbus, IN (US)

(73) Assignee: Cummins Inc., Columbus, IN (US)

( * ) Notice: Subject to any disclaimer, the term of this patent is extended or adjusted under 35 U.S.C. 154(b) by 123 days.

This patent is subject to a terminal disclaimer.

(21) Appl. No.: 18/097,026

(22) Filed: Jan. 13, 2023

(65) Prior Publication Data

US 2023/0141599 A1 May 11, 2023

Related U.S. Application Data

(63) Continuation of application No. 17/184,881, filed on Feb. 25, 2021, now Pat. No. 11,555,436, which is a
(Continued)

(51) Int. Cl.
*F01N 11/00* (2006.01)
*F02D 41/02* (2006.01)
*F01N 3/08* (2006.01)

(52) U.S. Cl.
CPC ............ *F01N 11/00* (2013.01); *F01N 11/002* (2013.01); *F02D 41/0235* (2013.01); *F01N 3/08* (2013.01);
(Continued)

(58) Field of Classification Search
CPC .......... F01N 11/00; F01N 11/002; F01N 3/08; F01N 2550/02; F01N 2900/0421;
(Continued)

(56) References Cited

U.S. PATENT DOCUMENTS 5,490,381 A     2/1996   Becker
6,068,528 A *   5/2000   Suzuki ...................... F01N 3/20
                                                      440/89 R (Continued)

FOREIGN PATENT DOCUMENTS

KR        101461326 B1 * 11/2014

OTHER PUBLICATIONS

EP Extended Search Report for European Application No. EP 19854096.5 mailing date Mar. 17, 2022, 10 pages.
(Continued)

*Primary Examiner* — Matthew T Largi
(74) *Attorney, Agent, or Firm* — Foley & Lardner LLP

(57) ABSTRACT

Systems, apparatuses, and methods for monitoring a catalyst health parameter are provided. A system includes one or more processing circuits having one or more memory devices coupled to one or more processors. The one or more memory devices store instructions that, when executed by the one or more processors, cause the one or more processors to: receive information indicative of at least one of a temperature of exhaust gas entering the aftertreatment system, a time at idle, or a mass flow of exhaust gas; determine a catalyst health management criteria based on the information; determine a catalyst health indicator based on the
(Continued)

catalyst health management criteria being met; compare the determined catalyst health indicator to a predetermined health threshold criteria; and provide a notification based on the determined catalyst health indicator being less than the predetermined health threshold criteria.

19 Claims, 3 Drawing Sheets

Related U.S. Application Data continuation of application No. PCT/US2019/048883, filed on Aug. 29, 2019.

(60) Provisional application No. 62/725,377, filed on Aug. 31, 2018.

(52) U.S. Cl.
CPC .. *F01N 2550/02* (2013.01); *F01N 2900/0421* (2013.01); *F01N 2900/1404* (2013.01); *F01N 2900/1411* (2013.01)

(58) Field of Classification Search
CPC ..... F01N 2900/1404; F01N 2900/1411; F02D 41/0235
See application file for complete search history.

(56) References Cited

U.S. PATENT DOCUMENTS

| | | |
|---|---|---|
| 6,510,393 B1 | 1/2003 | Steinigke |
| 6,598,387 B2 | 7/2003 | Carberry et al. |
| 6,651,422 B1 | 11/2003 | Legare |
| 7,500,358 B2 | 3/2009 | Singh et al. |
| 7,707,826 B2 | 5/2010 | Wang et al. |
| 7,788,911 B2 | 9/2010 | Zhang et al. |
| 2002/0197721 A1 | 12/2002 | Kinugawa et al. |
| 2003/0070420 A1* | 4/2003 | Uchida ................. F02D 41/024 60/285 |
| 2006/0230821 A1 | 10/2006 | Taglialatela-Scafati et al. |
| 2007/0266696 A1 | 11/2007 | Kawakita et al. |
| 2008/0104946 A1 | 5/2008 | Wang et al. |
| 2008/0271440 A1* | 11/2008 | Xu .......................... F01N 3/208 60/295 |
| 2009/0019833 A1 | 1/2009 | Yonushonis et al. |
| 2009/0151330 A1 | 6/2009 | Chamarthi et al. |
| 2012/0085081 A1 | 4/2012 | Mohammed et al. |
| 2012/0191288 A1 | 7/2012 | Qi et al. |
| 2012/0232730 A1 | 9/2012 | Sujan et al. |
| 2012/0232731 A1 | 9/2012 | Sujan et al. |
| 2014/0017794 A1* | 1/2014 | Zeng ..................... F01N 3/2066 422/62 |
| 2014/0223886 A1* | 8/2014 | Khaled ................... F01N 3/106 60/277 |
| 2014/0278003 A1 | 9/2014 | Kim et al. |
| 2015/0094877 A1* | 4/2015 | Tahnoose .............. B60W 50/00 701/1 |
| 2015/0176512 A1* | 6/2015 | Smith ................... F01N 3/2066 60/274 |
| 2015/0240686 A1* | 8/2015 | Light-Holets ......... F01N 3/2066 60/274 |
| 2016/0161093 A1 | 6/2016 | Peter et al. |
| 2017/0328294 A1 | 11/2017 | Poloni et al. |
| 2018/0197354 A1 | 7/2018 | Remboski et al. |

OTHER PUBLICATIONS

International Search Report and Written Opinion on International Application No. PCT/US2019/048883, mail date Dec. 20, 2019, 12 pages.
Non-Final Office Action on U.S. Appl. No. 17/184,881 DTD Mar. 31, 2022.
Notice of Allowance on U.S. Appl. No. 17/184,881 DTD Sep. 15, 2022.

* cited by examiner

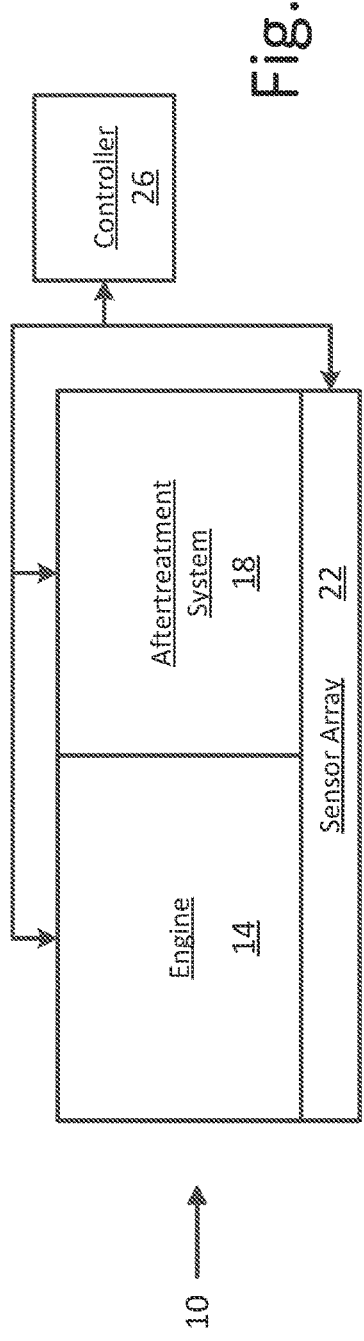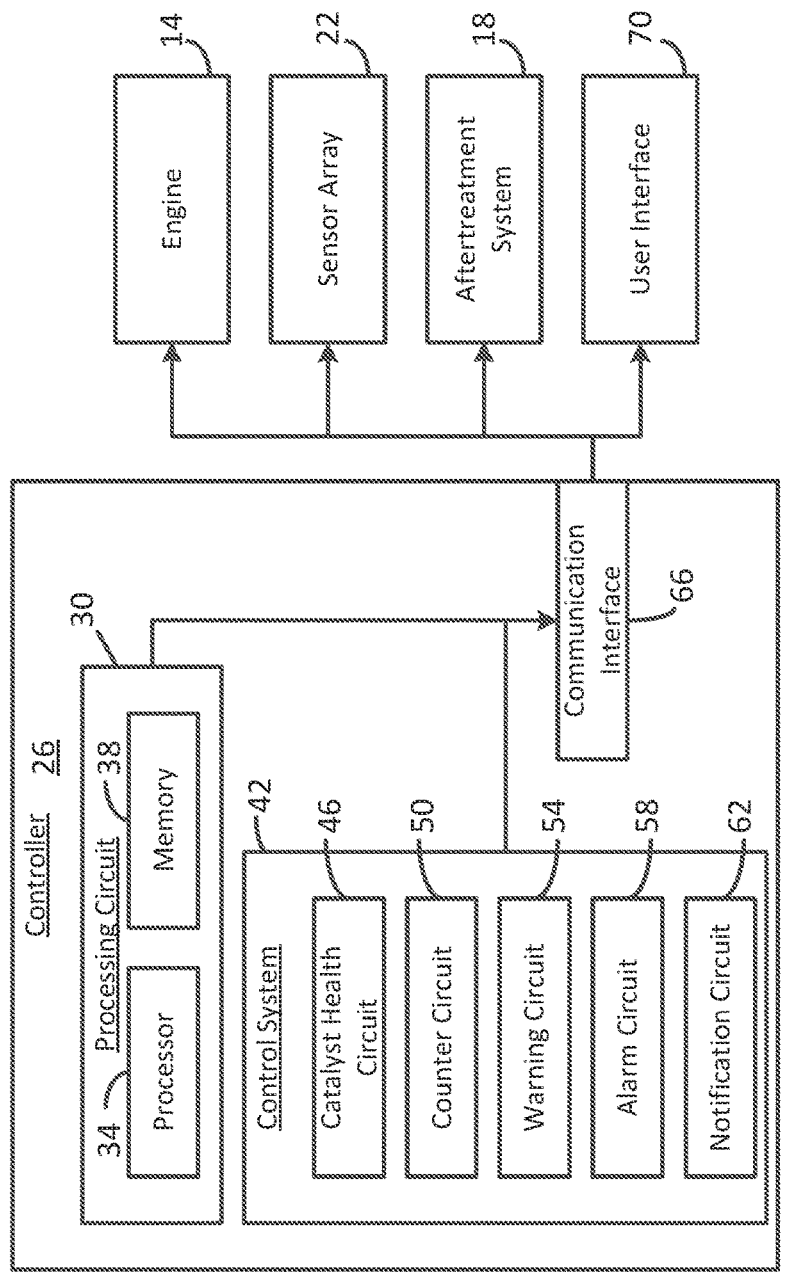

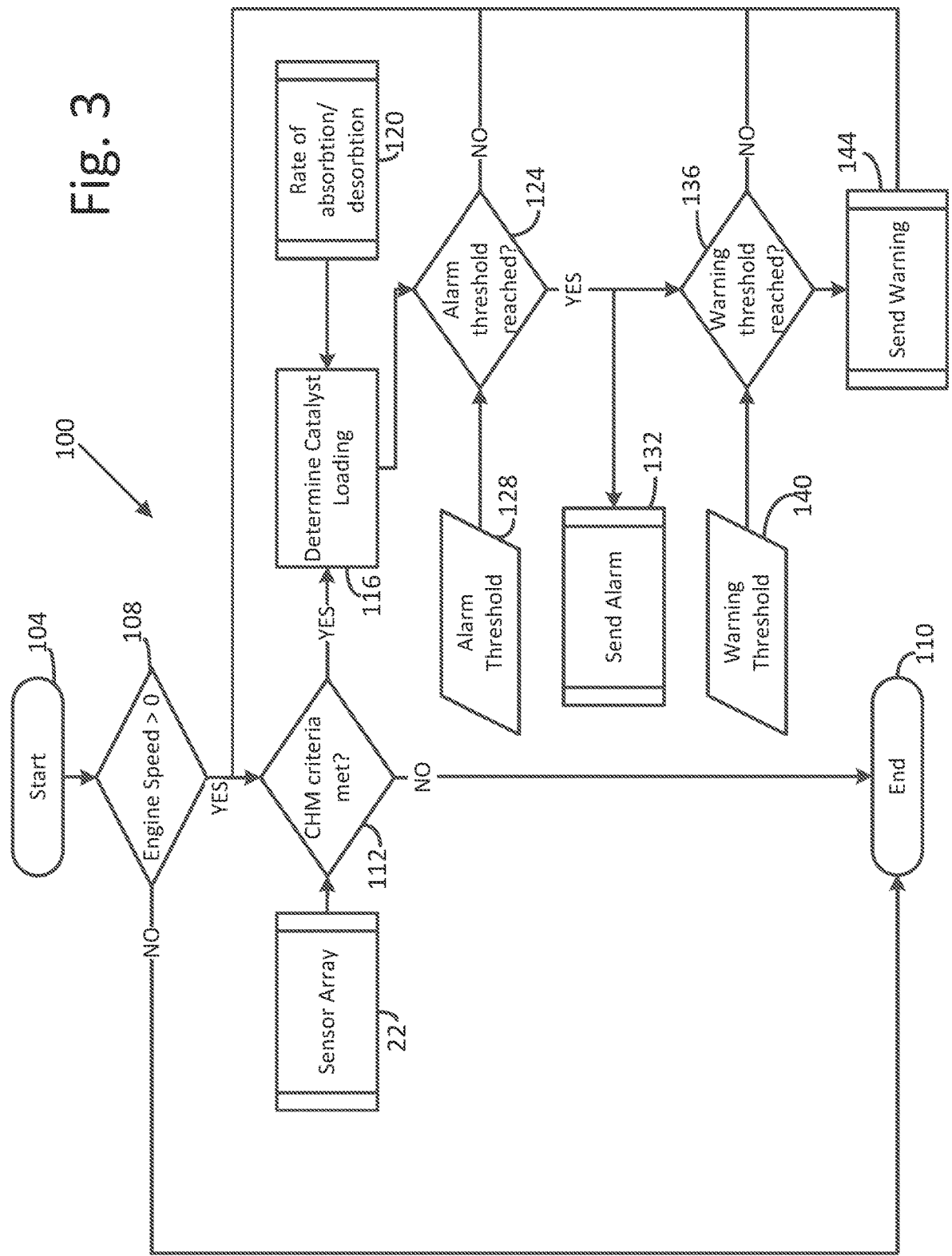

EXHAUST SPECIES TRACKING AND NOTIFICATION SYSTEM

CROSS-REFERENCE TO RELATED APPLICATIONS

This application is a continuation of U.S. patent application Ser. No. 17/184,881, filed on Feb. 25, 2021, which is a continuation of International Application No. PCT/US2019/048883, filed on Aug. 29, 2019, which claims priority to U.S. Provisional Patent Application No. 62/725,377 filed on Aug. 31, 2018, all of which are incorporated herein by reference in their entireties and for all purposes.

TECHNICAL FIELD

The present disclosure relates to engine exhaust aftertreatment systems. More particularly, the present disclosure relates to systems and methods for monitoring a catalyst of an aftertreatment system.

BACKGROUND

Catalyst health management (CHM) systems monitor a catalyst within an aftertreatment system (e.g., a catalyst within a selective catalytic reduction system). Older engine systems and aftertreatment systems may not be equipped with a CHM system and do not include actuators that could allow a CHM system to actively reduce catalyst loading or otherwise improve catalyst health without intervention of a human operator. In some applications, an idle state or low loading state of the engine can be maintained for long periods of time. Low loading conditions can lead to increased emissions or exhaust gas species flowing through the catalyst and increase the loading of the catalyst over time. Elevated catalyst loading can lead to undesirable exothermal events that prematurely degrade the catalyst. It is desirable for the human operator to be aware of catalyst loading.

SUMMARY

One embodiment relates to an apparatus that includes a circuit structured to receive information indicative of a catalyst health, determine a catalyst health management criteria has been met based on the information, determine a catalyst loading based on the information and the catalyst health management criteria being met, and compare the determined catalyst loading to a predetermined loading limit. The apparatus further includes a notification circuit coupled to the circuit, and structured to provide a notification when the determined catalyst load exceeds the predetermined loading limit.

Another embodiment relates to a system that includes an aftertreatment system including a catalyst, a sensor positioned to measure an exhaust gas temperature entering the aftertreatment system, a control circuit, and a notification circuit. The control circuit is structured to receive the exhaust gas temperature from the sensor, decrement a catalyst health indicator indicative of a health status of the catalyst in when the exhaust gas temperature is at or below a decrement threshold temperature (T1), increment the catalyst health indicator when the exhaust gas temperature is at or above an increment threshold temperature (T2), and hold the catalyst health indicator constant while the exhaust gas temperature is between the decrement threshold temperature (T1) and the increment threshold temperature (T2). The notification circuit is coupled to the control circuit and structured to provide a notification to an input/output device when the catalyst health indicator is less than or equal to a health warning threshold, or the catalyst health indicator is below a standard value for a predetermined amount of time.

Another embodiment relates to a method that includes receiving information indicative of a temperature within an exhaust gas aftertreatment system, decrementing a catalyst health indicator indicative of a health status of a catalyst in the exhaust gas aftertreatment system when the temperature is at or below a decrement threshold temperature (T1), incrementing the catalyst health indicator while the temperature is at or above an increment threshold temperature (T2), holding the catalyst health indicator constant while the temperature is between the decrement threshold temperature (T1) and the increment threshold temperature (T2), and providing a warning notification to an input/output device when the catalyst health indicator is below a health warning threshold.

These and other features, together with the organization and manner of operation thereof, will become apparent from the following detailed description when taken in conjunction with the accompanying drawings.

BRIEF DESCRIPTION OF THE FIGURES

FIG. 1 is a schematic view of an engine system according to some embodiments.

FIG. 2 is a schematic view of a controller of the engine system of FIG. 1.

FIG. 3 is a flow diagram of a method of operating the engine system of FIG. 1 according to some embodiments.

DETAILED DESCRIPTION

Figure 4:
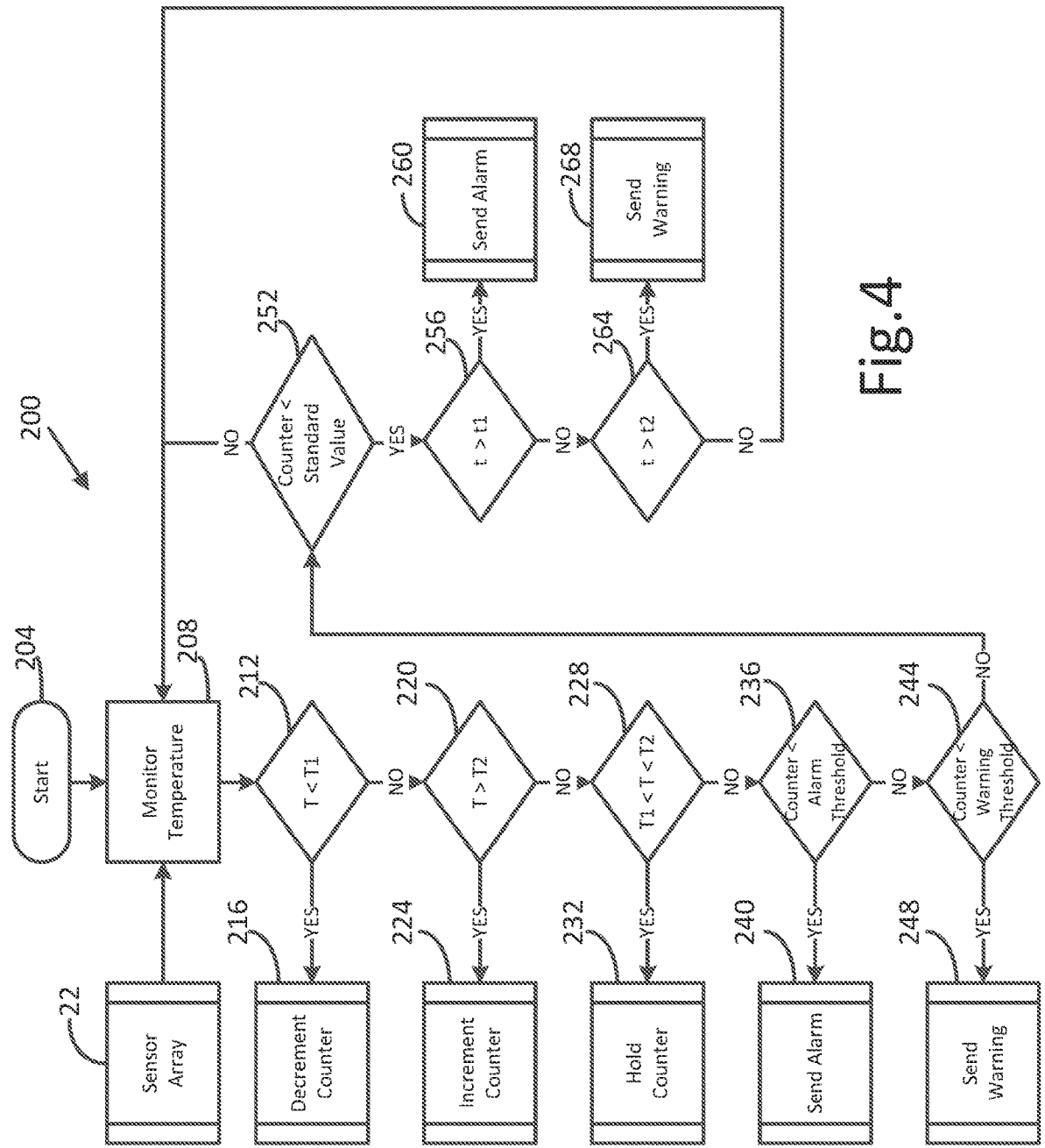
FIG. 4 is a flow diagram of a method of operating the engine system of FIG. 1 according to some embodiments.

Following below are more detailed descriptions of various concepts related to, and implementations of, methods, apparatuses, and systems for an engine exhaust aftertreatment system that monitors a catalyst loading over time and provides a warning and an alert when catalyst loading becomes high, such as above a preset or predefined threshold. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for a system that monitors a catalyst health parameter over time to determine a catalyst loading. In some examples, the system monitors a temperature of exhaust gases entering the aftertreatment system. If the temperature is below a decrement temperature threshold, then the catalyst health parameter is decremented. If the temperature is above an increment temperature threshold, then the catalyst health parameter is incremented. If the temperature is between the decrement temperature threshold and the increment temperature threshold, then the catalyst health parameter is held. The system continues to monitor the catalyst health parameter and provides a warning notification when the catalyst health parameter is less than a warning threshold, and an alarm notification when the catalyst health parameter is less than an alarm threshold. The warning notification and the alarm notification may be sent to a notification device that uses audio and/or visual indicators that instruct a user or operator to increase a loading on the engine (e.g., revving the engine, etc.).

As shown in FIG. 1, an engine system 10 includes an internal combustion engine 14, an engine exhaust aftertreatment system 18 that treats the exhaust of the engine 14, a sensor array 22 that monitors conditions of the engine 14 and the aftertreatment system 18, and a controller 26 coupled to the engine 14, the aftertreatment system 18, and the sensor array 22 to control, at least partly, operation of the engine 14 and the aftertreatment system 18. In some embodiments, the engine 14 is a diesel engine used in a marine application or in a vehicle. In the example shown, the engine 14 is a compression-ignition engine that utilizes diesel fuel. Of course, in other embodiments, different engine configurations are possible, such as a spark-ignition engine. In some embodiments, the engine system 10 is not equipped with an electronic throttling valve, a turbo wastegate, a variable geometry turbo, and/or post injection systems.

In the example shown, the aftertreatment system 18 includes a selective catalytic reduction (SCR) system including a catalyst. SCR systems convert nitrogen oxides present in the exhaust gases produced by the engine 14 into diatomic nitrogen and water through oxidation within a catalyst. A diesel exhaust fluid (DEF) is added to the exhaust gas stream to aid in the catalytic reduction. During idle or other low load operations, the catalyst can become loaded with undesirable exhaust gas species, coke, and/or particulate deposits. Loading of the catalyst can lead to exothermal events such as sparking or burning that can reduce the usable life of the catalyst. For example, one situation includes going from a condition where the SCR was loaded with undesirable particles to a high load condition (particularly, high exhaust gas temperature). As a result, at least some of the undesirable particles may burn off at an uncontrollable rate, which causes the temperature to exceed desired operating temperatures. This temperature may lead to deactivation in the catalyst, which reduces the efficacy of the catalyst. Therefore, it is desirable to avoid excessive loading of the catalyst.

The sensor array 22 includes many sensors, both real and virtual (or any combination thereof, such as all real, all virtual, a majority real, etc.), arranged to measure or otherwise acquire data, values, or information regarding attributes of the engine 14 and the aftertreatment system 18. In some embodiments, the sensor array 22 includes a temperature sensor positioned between the engine 14 and the aftertreatment system 18 and structured to send a signal to the controller 26 indicative of the temperature of exhaust gases exiting the engine 14 and entering the aftertreatment system 18. In some embodiments, the sensor array 22 includes a temperature sensor structured to detect a temperature of exhaust gases exiting the engine 14. In some embodiments, the sensor array 22 includes a temperature sensor positioned to detect a temperature of exhaust gases entering the catalyst. In some embodiments, the sensor array 22 includes oxygen sensors, pressure sensors, mass flow sensors, or other types of sensors for determining a characteristic of exhaust gas species entering the aftertreatment system 18.

The controller 26 is structured to at least partly control the engine 14 and the aftertreatment system 18. The controller 26 is coupled with the sensor array 22 and receives signals therefrom. The controller 26 uses the signals received from the sensor array 22 to determine catalyst loading and perform actions in response.

As the components of FIG. 1 are shown to be embodied in a vehicle or a marine application, the controller 26 may be structured as one or more electronic control units (ECU). The controller 26 may be separate from or included with at least one of a transmission control unit, an exhaust aftertreatment control unit, a powertrain control module, an engine control module, etc. The function and structure of the controller 26 is described in greater detail in FIG. 2.

Referring now to FIG. 2, a schematic diagram of the controller 26 of the engine system 10 of FIG. 1 is shown according to an example embodiment. As shown in FIG. 2, the controller 26 includes a processing circuit 30 having a processor 34 and a memory device 38, a control system 42 having a catalyst health circuit 46, a counter circuit 50, a warning circuit 54, an alarm circuit 58, and a notification circuit 62, and a communications interface 66.

In one configuration, the catalyst health circuit 46, the counter circuit 50, the warning circuit 54, the alarm circuit 58, and the notification circuit 62 are embodied as machine or computer-readable media that is executable by a processor, such as processor 34. The machine or computer-readable medium may be stored by one or more memory devices, such as that described below with respect to memory device 38. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the catalyst health circuit 46, the counter circuit 50, the warning circuit 54, the alarm circuit 58, and the notification circuit 62 are embodied as hardware units, such as electronic control units. As such, the catalyst health circuit 46, the counter circuit 50, the warning circuit 54, the alarm circuit 58, and the notification circuit 62 may be embodied as one or more circuitry components including, but not limited to, processing circuitry, network interfaces, peripheral devices, input devices, output devices, sensors, etc. In some embodiments, the catalyst health circuit 46, the counter circuit 50, the warning circuit 54, the alarm circuit 58, and the notification circuit 62 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the catalyst health circuit 46, the counter circuit 50, the warning circuit 54, the alarm circuit 58, and the notification circuit 62 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The catalyst health circuit 46, the counter circuit 50, the warning circuit 54, the alarm circuit 58, and the notification circuit 62 may also include programmable hardware devices such as field programmable gate arrays, programmable array logic, programmable logic devices or the like. The catalyst health circuit 46, the counter circuit 50, the warning circuit 54, the alarm circuit 58, and the notification circuit 62 may include one or more memory devices for storing instructions that are executable by the processor(s) of the catalyst health circuit 46, the counter circuit 50, the warning circuit 54, the alarm circuit 58, and the notification circuit 62. The one or more memory devices and processor(s) may have the same definition as provided below with respect to the memory device 38 and processor 34. In some hardware unit configurations, the catalyst health circuit 46, the counter circuit 50, the warning circuit 54, the alarm circuit 58, and the notification circuit 62 may be geographically dispersed throughout separate locations in the vehicle. Alternatively and as shown, the catalyst health circuit 46, the counter circuit 50, the warning circuit 54, the alarm circuit 58, and the notification circuit 62 may be embodied in or within a single unit/housing, which is shown as the controller 26.

In the example shown, the controller 26 includes a processing circuit 30 having a processor 34 and a memory device 38. The processing circuit 30 may be structured or configured to execute or implement the instructions, commands, and/or control processes described herein with respect to catalyst health circuit 46, the counter circuit 50, the warning circuit 54, the alarm circuit 58, and the notification circuit 62. The depicted configuration represents the catalyst health circuit 46, the counter circuit 50, the warning circuit 54, the alarm circuit 58, and the notification circuit 62 as machine or computer-readable media. However, as mentioned above, this illustration is not meant to be limiting as the present disclosure contemplates other embodiments where the catalyst health circuit 46, the counter circuit 50, the warning circuit 54, the alarm circuit 58, and the notification circuit 62, or at least one circuit of the catalyst health circuit 46, the counter circuit 50, the warning circuit 54, the alarm circuit 58, and the notification circuit 62, is configured as a hardware unit. All such combinations and variations are intended to fall within the scope of the present disclosure.

The processor 34 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., catalyst health circuit 46, the counter circuit 50, the warning circuit 54, the alarm circuit 58, and the notification circuit 62 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 38 (e.g., RAM, ROM, Flash Memory, hard disk storage, etc.) may store data and/or computer code for facilitating the various processes described herein. The memory device 38 may be communicably connected to the processor 34 to provide computer code or instructions to the processor 34 for executing at least some of the processes described herein. Moreover, the memory device 38 may be or include tangible, non-transient volatile memory or non-volatile memory. Accordingly, the memory device 38 may include database components, object code components, script components, or any other type of information structure for supporting the various activities and information structures described herein.

The catalyst health circuit 46 is structured to communicate with the sensor array 22 via the communications interface 66 and to determine a catalyst health parameter based on information received from the sensor array 22. In some embodiments, the catalyst health parameter is a temperature of exhaust gases entering the aftertreatment system 18. In some embodiments, the catalyst health parameter is a temperature of a catalyst. In some embodiments, the catalyst health parameter is a temperature of exhaust gases exiting the engine 14. In some embodiments, the catalyst health parameter is a mass flow rate of exhaust gases entering the aftertreatment system determined based on oxygen sensor and mass flow sensor information. In some embodiments, the catalyst health parameter is a theoretical, estimated, or otherwise determined mass flow rate of a particular exhaust species (e.g., NOx) or group of exhaust species entering the aftertreatment system 18 based on information from a variety of sensors, real and/or virtual. In still other embodiments, the catalyst health parameter is a combination of the above-mentioned parameters. The catalyst health parameter is generally indicative of a characteristic, such as quantity, of exhaust gas species entering or loading onto a catalyst of the aftertreatment system 18.

The counter circuit 50 is structured to receive the catalyst health parameter from the catalyst health circuit 46 and to manage a catalyst health indicator based at least in part on the catalyst health parameter. In some embodiments, the catalyst health indicator is a calibrated value dependent on the arrangement of the engine 14 and aftertreatment system 18. In some embodiments, the catalyst health indicator is a percentage value based on the catalyst health parameter as discussed below.

The catalyst health indicator tracks catalyst loading over time. If catalyst loading exceeds a threshold, an indication is provided to reduce catalyst loading. The catalyst health indicator is 100% when the catalyst is unloaded (i.e., a clean state). In other words, when the catalyst has not absorbed exhaust gas species, the catalyst health indicator is 100%. Over time, as catalyst loading occurs, the catalyst health indicator will decrease over time. For example, after the engine 14 has been operating at idle and producing a relatively low exhaust gas temperature at the inlet of the aftertreatment system 18 for a prolonged period, the catalyst health indicator will decrease lower than 100%. Conversely, if loading on the engine 14 is increased and the exhaust gas temperature entering the aftertreatment system 18 increases, the catalyst health indicator is incremented and raises back toward 100% as exhaust gas species are released/removed from the catalyst.

In some embodiments, a decrement threshold is stored in the memory 38 and utilized by the counter circuit 50 to determine if the catalyst is absorbing exhaust gas species and becoming loaded. For example, the decrement threshold can be a decrement threshold temperature (T1). When the catalyst health parameter (e.g., the inlet temperature of the aftertreatment system 18) is below the decrement threshold temperature (T1), the catalyst health indicator is decremented at a decrement rate. In one embodiment, the decrement rate is proportional to a difference between the catalyst health parameter and the decrement threshold temperature (T1). In other embodiments, the decrement rate is constant, such that the catalyst health indicator is decremented at a constant rate over time for as long as the catalyst health parameter remains below the decrement threshold temperature (T1). In yet other embodiments, the catalyst health indicator is decremented according to another algorithm or relationship to the catalyst health parameter. In some embodiments, the catalyst health indicator is decremented based on another parameter and not temperature. For example, the catalyst health indicator could be decremented based on a mass flow of exhaust gas species entering the aftertreatment system 18.

In some embodiments, an increment threshold is stored in the memory 38 and utilized by the counter circuit 50 to determine if the catalyst is adsorbing exhaust gas species and reducing loading. For example, the increment threshold can be an increment threshold temperature (T2). In some embodiments, the decrement threshold temperature (T1) is less than the increment threshold temperature (T2). When the catalyst health parameter (e.g., the inlet temperature of the aftertreatment system 18) is above the increment threshold temperature (T2), the catalyst health indicator is incremented at an increment rate. In one embodiment, the increment rate is proportional to a difference between the catalyst health parameter and the increment threshold temperature (T2). In another embodiment, the increment rate is constant, such that the catalyst health indicator is incremented at a constant rate over time for as long as the catalyst health parameter remains above the increment threshold temperature (T2). In other embodiments, the catalyst health indicator is incremented according to another algorithm or relationship to the catalyst health parameter. In yet other embodiments, the catalyst health indicator is incremented based on another parameter and not temperature. For example, the catalyst health indicator could be incremented based on a mass flow of exhaust gas species entering the aftertreatment system 18.

The counter circuit 50 is structured to hold or maintain the catalyst health indicator when the catalyst health parameter is between the decrement threshold and the increment threshold. In some embodiments, if the inlet temperature of the aftertreatment system 18 is less than the increment threshold temperature (T2) and greater than the decrement threshold temperature (T1), the counter circuit 50 determines that no significant change in loading of the catalyst is occurring and the catalyst health indicator is held constant.

The counter circuit 50 is structured to alter the catalyst health indicator based on the catalyst health parameter and to provide an indication of the loading of the catalyst within the aftertreatment system 18.

The warning circuit 54 is coupled with the counter circuit 50 and utilizes a health warning threshold stored in the memory device 38. The warning circuit 54 compares the catalyst health indicator to the health warning threshold and determines a warning status if the catalyst health indicator passes the health warning threshold. In some embodiments, the health warning threshold is an example of a predetermined loading limit, and the warning status indicates that the predetermined loading limit has been exceeded. In some embodiments, the warning status is determined if the catalyst health indicator falls below the health warning threshold. In some embodiments, the health warning threshold is 75%. In some embodiments, the health warning threshold is between about 50% and about 80%.

The alarm circuit 58 is coupled with the counter circuit 50 and utilizes a health alarm threshold stored in the memory device 38. The alarm circuit 58 compares the catalyst health indicator to the health alarm threshold and determines an alarm status if the catalyst health indicator passes the health alarm threshold. In some embodiments, the health alarm threshold is an example of a predetermined loading limit, and the alarm status indicates that the predetermined loading limit has been exceeded. In some embodiments, the alarm status is determined if the catalyst health indicator falls below the health alarm threshold. In some embodiments, the health alarm threshold is 50%. In some embodiments, the health alarm threshold is between about 25% and about 70%.

The notification circuit 62 is structured to receive the warning status from the warning circuit 54 and provide a warning signal to a user interface 70 via the communication interface 66. In some embodiments, the warning signal provides an audio, visual, or audio-visual warning that is observable by a user of the engine 14 and indicates that the engine 14 loading should be increased. In some embodiments, the warning signal provides an instruction to increase engine speed. In some embodiments, the warning signal provides only an audio or only a visual indication via the user interface 70.

The notification circuit 62 is further structured to receive the alarm status from the alarm circuit 58 and provide an alarm signal to the user interface 70 via the communication interface 66. In some embodiments, the alarm signal prompts an audio, visual, or audio-visual alarm that is observable by a user of the engine 14 and instructs the user that the engine 14 loading must be increased top avoid damage to the catalyst. In some embodiments, the alarm signal provides an instruction to increase engine speed. In some embodiments, the alarm signal prompts only an audio or only a visual indication via the user interface 70.

In some embodiments, only one of the warning status and the alarm status is used, so that the operator only receives one type of indication that engine loading should be increased. In some embodiments, the user interface 70 is operator customizable. For example, a dial type display can be used where a warning status is indicated in a yellow section, and an alarm status is indicated in a red section. In some embodiments, audible alarms or instructions are provided.

In some embodiments, the warning circuit 54 and the alarm circuit 58 are eliminated and the counter circuit 50 provides the catalyst health indicator to the notification circuit 62. The notification circuit 62 then communicates with the user interface 70 via the communications interface 66 and the catalyst health indicator is provided directly to the operator. In some embodiments, the notification circuit 62 is structured to correlate the catalyst health indicator to a simple count (e.g., a discrete number for display), or a grams/Liter loading of a specific species or group of species.

In some embodiments, the notification circuit 62 is structured to log a fault code in the memory device 38 or broadcast a fault code to a remote memory (e.g., a server or network) if a warning status or an alarm status are sent. The fault codes can be stored in a data log and used for future service, maintenance, or repair. The data log can track times and conditions related to the warning status and/or alarm status. For example, a data file containing temperature history leading to the warning status or alarm status may be stored.

In some embodiments, the controller 26 monitors for unburnt hydrocarbons, coke, and/or physical deposits. The same architecture can be used to monitor for these other catalyst health factors. For example, the sensor array 22 may include other sensors that are utilized by the controller 26 to monitor for other catalyst health factors.

As shown in FIG. 3, the controller 26 is structured to execute a method 100 for monitoring catalyst health. The method starts at step 104 and the speed of the engine 14 is monitored at step 108. If the speed of the engine 14 is zero, the method 100 determines that the engine 14 is not running and ends the method at step 110. In the speed of the engine 14 is non-zero, the method proceeds to step 112 where a catalyst health management criteria is checked.

The catalyst health management criteria indicates that catalyst loading is likely to occur and that the controller 26 should start monitoring for catalyst loading. In some embodiments, the catalyst health management criteria includes a threshold temperature and a time. For example, the threshold temperature could be 290 degrees Celsius and the time could be one hour. In this situation, catalyst loading is expected due to relatively low exhaust gas temperatures existing for an elongated period of time. Other catalyst health management criteria are contemplated, such as time at idle, or a measured mass flow of exhaust gas species, for example.

If the catalyst health management criteria is met at step 112, the method 100 proceeds to step 116 and catalyst loading is determined. In some embodiments, the catalyst health circuit 46 and the counter circuit 50 cooperate to track or count loading on the catalyst over time. In some embodiments, a catalyst health indicator is updated by the counter circuit 50 at step 116. The controller counter circuit 50 utilizes the decrement rate and the increment rate based on values stored in the memory device 38 and provided to the counter circuit 50 at step 120. The decrement rate and the increment rate correlate to rates of absorption and adsorption of exhaust gas species into the catalyst.

At step 124, the catalyst health indicator is compared by the alarm circuit 58 to an alarm threshold received at step 128 from the memory device 38. If the catalyst health indicator has reached the alarm threshold, the alarm circuit 58 provides an alarm status to the notification circuit at step 132. In some embodiments, the alarm circuit 58 provides the alarm status when the catalyst health indicator is less than the alarm threshold. The alarm status is then relayed to the user interface 70 and the user is prompted to increase loading on the engine 14. In some embodiments, the alarm status prompts and engine shut down command that is structured to communicate with an engine ignition kill switch or another arresting device structured to stop operation of the engine 14.

If the alarm threshold has not been reached at step 124, the method 100 proceeds to step 136 where the catalyst health indicator is compared by the warning circuit 54 to a warning threshold received at step 140 from the memory device 38. If the catalyst health indicator has reached the warning threshold, the warning circuit 54 provides a warning status to the notification circuit at step 144. In some embodiments, the warning circuit 54 provides the warning status when the catalyst health indicator is less than the warning threshold. The warning status is then relayed to the user interface 70 and the user is prompted to increase loading on the engine 14. For example, the user may be instructed to increase engine speed; change a transmission setting (e.g., downshift while maintaining a high speed, etc.); etc. and/or some combination thereof. After the warning status is sent, the method 100 continues to monitor the catalyst health management criteria and update the catalyst health indicator.

As shown in FIG. 4, the controller 26 is structured to execute a method 200 for monitoring catalyst health. The method 200 starts at step 204 and continues at step 208 where the catalyst health circuit 46 monitors an exhaust gas temperature (T) entering the aftertreatment system 18 sensed by the sensor array 122. At step 212, the counter circuit 50 compares the exhaust gas temperature (T) to the decrement threshold temperature (T1). If the exhaust gas temperature (T) is less than the decrement threshold temperature (T1), then the counter circuit 50 decrements the catalyst health indicator at step 216. If the exhaust gas temperature (T) is not less than the decrement threshold temperature (T1), then the method 200 continues to step 220.

At step 220, the counter circuit 50 compares the exhaust gas temperature (T) to the increment threshold temperature (T2). If the exhaust gas temperature (T) is greater than the increment threshold temperature (T2), then the counter circuit 50 increments the catalyst health indicator at step 224. If the exhaust gas temperature (T) is not greater than the increment threshold temperature (T2), then the method 200 continues to step 228.

At step 228, the counter circuit 50 confirms that the exhaust gas temperature (T) is between the decrement threshold temperature (T1) and the increment threshold temperature (T2), and the counter circuit 50 holds the catalyst health indicator at step 232. At step 236, the alarm circuit 58 compares the catalyst health indicator to the alarm threshold. If the catalyst health indicator is less than the alarm threshold, the alarm circuit provides the alarm status at step 240. If the catalyst health indicator is not less than the alarm threshold, the method 200 proceeds to step 244 and the warning circuit 54 compares the catalyst health indicator to the warning threshold.

If the catalyst health indicator is less than the warning threshold, then the warning circuit 54 provides that warning status at step 248. In some embodiments, the method 200 returns to step 208 and continues to monitor the exhaust gas temperature (T).

In some embodiments, the method 200 continues to step 252 and the counter circuit 50 further compares the catalyst health indicator to a standard value. In some embodiments, the standard value is 100% indicating zero catalyst loading. In some embodiments, the standard value is about 90% indicating a small, but manageable amount of catalyst loading. If the catalyst health indicator is less than the standard value, the counter circuit 50 starts a timer and records a time (t). The time (t) continues to increase as long as the catalyst health indicator is below the standard value. At step 256, the alarm circuit 58 compares the time (t) to an alarm time threshold (t1). If the time (t) exceeds the alarm threshold time, the alarm circuit 58 sends the alarm status at step 260. If the time (t) is not greater that the alarm threshold time (t1), then the method 200 continues to step 264 and the warning circuit 54 compares the time (t) to a warning threshold time (t2). If the time (t) is greater than the warning threshold time (t), then the waring circuit 54 sends the warning status at step 268. If the time (t) is less than the warning threshold time, the method 200 continues to monitor the exhaust gas temperature at step 208. In some embodiments, the warning threshold time (t2) can be about ten hours and the alarm threshold time (t1) can be about fourteen hours.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-4, it should be understood that the controller 26 may include any number of circuits for completing the functions described herein. For example, the activities and functionalities of the catalyst health circuit 46, the counter circuit 50, the warning circuit 54, the alarm circuit 58, and the notification circuit 62 may be combined in multiple circuits or as a single circuit. Additional circuits with additional functionality may also be included. Further, the controller 26 may further control other activity beyond the scope of the present disclosure.

As mentioned above and in one configuration, the "circuits" may be implemented in machine-readable medium for execution by various types of processors, such as processor 34 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An exhaust aftertreatment system control system, comprising:
   one or more processing circuits comprising one or more memory devices coupled to one or more processors, the one or more memory devices storing instructions that, when executed by the one or more processors, cause the one or more processors to:
      receive information indicative of at least one of a temperature of exhaust gas entering the aftertreatment system, a time at idle, or a mass flow of exhaust gas;
      determine that a catalyst health management criteria is met based on the information indicative of the at least one of the temperature of exhaust gas entering the aftertreatment system, the time at idle, or the mass flow of exhaust gas, wherein the catalyst health management criteria is indicative of an amount of catalyst loading;
      determine a catalyst health indicator based on the catalyst health management criteria being met;
      compare the determined catalyst health indicator to a predetermined health threshold criteria;
      determine an elapsed time during which the determined catalyst health indicator is less than the predetermined health threshold criteria; and
      provide a notification in response to the elapsed time exceeding a predetermined time threshold.

2. The exhaust aftertreatment system control system of claim 1, wherein the notification is at least one of a graphical display or an audible alarm instruction.

3. The exhaust aftertreatment system control system of claim 1, wherein the one or more memory devices are further configured to store instructions that, when executed by the one or more processors, cause the one or more processors to determine the catalyst health indicator based on an increment or decrement rate stored in the one or more memory devices.

4. The aftertreatment control system of claim 1, wherein the predetermined health threshold criteria includes a threshold temperature.

5. The exhaust aftertreatment system control system of claim 4, wherein the catalyst health management criteria includes a catalyst temperature, and wherein the one or more memory devices are further configured to store instructions that, when executed by the one or more processors, cause the one or more processors to determine the catalyst health management criteria of the catalyst temperature exceeds the predetermined health threshold criteria when the catalyst health management criteria of the catalyst temperature includes a temperature that is less than or equal to approximately 290 degrees Celsius and a time that is greater than or equal to approximately one hour.

6. The exhaust aftertreatment system control system of claim 1, wherein the predetermined health threshold criteria includes an alarm threshold value and a warning threshold value.

7. The exhaust aftertreatment system control system of claim 6, wherein when the catalyst health indicator is equal to the alarm threshold value, the notification is an audible alarm, and wherein when the catalyst health indicator is equal to the warning threshold, the notification is a warning.

8. The exhaust aftertreatment system control system of claim 1, wherein the one or more memory devices are further configured to store instructions that, when executed by the one or more processors, cause the one or more processors to generate a fault code when the determined catalyst health indicator is less than the predetermined health threshold criteria and the fault code is stored in the one or more memory devices.

9. The exhaust aftertreatment system control system of claim 1, wherein the one or more memory devices are further configured to store instructions that, when executed by the one or more processors, cause the one or more processors to determine the catalyst health indicator using a decrement rate and an increment rate based on at least one value stored in the one or more memory devices.

10. The exhaust aftertreatment system control system of claim 9, wherein the decrement rate and the increment rate correlate to rates of absorption and adsorption on a catalyst, respectively, of a predefined exhaust gas species.

11. An exhaust aftertreatment system, comprising:
a catalyst;
a sensor configured to receive information regarding an exhaust gas temperature entering the exhaust aftertreatment system; and
one or more processing circuits comprising one or more memory devices coupled to one or more processors, the one or more memory devices storing instructions that, when executed by the one or more processors, cause the one or more processors to:
receive information from the sensor;
determine that a catalyst health management criteria is met based on the information including at least one of a temperature of exhaust gas entering the aftertreatment system, a time at idle, or a mass flow of exhaust gas, wherein the catalyst health management criteria is indicative of an amount of catalyst loading;
determine a catalyst health indicator based on the catalyst health management criteria being met;
compare the determined catalyst health indicator to a predetermined health threshold criteria;
determine an elapsed time during which the determined catalyst health indicator is less than the predetermined health threshold criteria; and
provide a notification in response to the elapsed time exceeding a predetermined time threshold.

12. The exhaust aftertreatment system of claim 11, wherein the one or more memory devices are further configured to store instructions that, when executed by the one or more processors, cause the one or more processors to decrement the catalyst health indicator when the exhaust gas temperature is at or below a decrement threshold temperature (T1);
increment the catalyst health indicator when the exhaust gas temperature is at or above an increment threshold temperature (T2); and
hold the catalyst health indicator constant while the exhaust gas temperature is between the decrement threshold temperature (T1) and the increment threshold temperature (T2).

13. The exhaust aftertreatment system of claim 11, wherein the one or more memory devices are further configured to store instructions that, when executed by the one or more processors, cause the one or more processors to provide the notification to an input/output device when the catalyst health indicator is less than or equal to a health warning threshold value.

14. The exhaust aftertreatment system of claim 11, wherein the catalyst health management criteria includes a catalyst temperature, and wherein the one or more memory devices are further configured to store instructions that, when executed by the one or more processors, cause the one or more processors to determine the catalyst health management criteria of the catalyst temperature exceeds the predetermined health threshold criteria when the catalyst health management criteria of the catalyst temperature includes a temperature that is less than or equal to approximately 290 degrees Celsius and a time that is greater than or equal to approximately one hour.

15. A method, comprising:
receiving information indicative of at least one of an engine out temperature, a time at idle, or a mass flow of exhaust gas;
determining that a catalyst health management criteria is met based on the information indicative of the at least one of the engine out temperature, the time at idle, or the mass flow of exhaust gas, wherein the catalyst health management criteria is indicative of an amount of catalyst loading;
determining a catalyst health indicator based on the catalyst health management criteria being met;
comparing the determined catalyst health indicator to a predetermined health threshold criteria;
determining an elapsed time during which the determined catalyst health indicator is less than the predetermined health threshold criteria; and
providing a notification in response to the elapsed time exceeding a predetermined time threshold.

16. The method of claim 15, further comprising logging a fault in a non-volatile memory when the catalyst health indicator is less than the predetermined health threshold criteria.

17. The method of claim 15, wherein the notification includes providing at least one of a graphical display or an audible alarm instruction.

18. The method of claim 15, wherein the catalyst health management criteria comprises a temperature value, and wherein the catalyst health management criteria of the temperature value exceeds the predetermined health threshold criteria when the engine out temperature is less than or equal to approximately 290 degrees Celsius.

19. The method of claim 15, further comprising automatically controlling an engine to increase engine loading in response to providing the notification.

\* \* \* \* \*